(12) United States Patent
Wollmann et al.

(10) Patent No.: US 8,759,711 B2
(45) Date of Patent: Jun. 24, 2014

(54) SYSTEM FOR SPOT WELDING WITH A LASER BEAM

(75) Inventors: Werner Wollmann, Jena (DE); Wilfried Kraemer, Jena (DE); Jan Langebach, Gera (DE); Sven Fischbach, Starsiedel (DE)

(73) Assignee: JENOPTIK Automatisierung Stechnik GmbH, Jena (DE)

( * ) Notice: Subject to any disclaimer, the term of this patent is extended or adjusted under 35 U.S.C. 154(b) by 785 days.

(21) Appl. No.: 12/944,258

(22) Filed: Nov. 11, 2010

(65) Prior Publication Data

US 2011/0108529 A1   May 12, 2011

(30) Foreign Application Priority Data

Nov. 11, 2009 (DE) .......................... 10 2009 053 261

(51) Int. Cl.
*B23K 26/00* (2014.01)
*B23K 26/02* (2014.01)
*B23K 26/22* (2006.01)
*B23K 26/073* (2006.01)

(52) U.S. Cl.
CPC .............. *B23K 26/023* (2013.01); *B23K 26/22* (2013.01); *B23K 26/0732* (2013.01)
USPC ................................ 219/121.63; 219/121.64

(58) Field of Classification Search
CPC ... B23K 26/023; B23K 26/0732; B23K 26/22
USPC ............. 219/121.14, 121.13, 121.74, 121.78, 219/121.64, 121.63, 121.45, 121.46, 219/121.59, 121.54, 121.57; 156/379.6, 156/272.8
See application file for complete search history.

(56) References Cited

U.S. PATENT DOCUMENTS

| 4,534,811 | A |   | 8/1985  | Ainslie et al. |
|-----------|---|---|---------|----------------|
| 4,973,817 | A | * | 11/1990 | Kanno et al. ............. 219/121.63 |
| 5,049,720 | A | * | 9/1991  | Fang et al. ................ 219/121.63 |
| 5,170,029 | A | * | 12/1992 | Kubo et al. .............. 219/121.14 |
| 5,298,715 | A | * | 3/1994  | Chalco et al. ............. 219/121.64 |
| 5,738,681 | A | * | 4/1998  | Shimizu ........................... 606/17 |
| 6,713,713 | B1 |  | 3/2004  | Caldwell et al. |
| 7,803,661 | B2 |  | 9/2010  | Kim |
| 2005/0039855 | A1 | * | 2/2005 | Chen et al. .................. 156/379.6 |
| 2006/0249487 | A1 |   | 11/2006 | Dunias et al. |

FOREIGN PATENT DOCUMENTS

| CN | 101 239 421 A | 8/2008 |
| CN | 101 295 658 A | 10/2008 |
| CN | 101 351 298 A | 1/2009 |
| DE | 197 49 909 A1 | 6/1998 |

(Continued)

*Primary Examiner* — Tu Hoang
*Assistant Examiner* — Thien S Tran
(74) *Attorney, Agent, or Firm* — Duane Morris LLP

(57) ABSTRACT

The present invention relates to a system for spot welding with a laser beam (6) in which the laser beam (6) passes through a tube (3) and impinges on the components (7.1, 7.2) to be welded together. The cross section of the laser beam (6) is formed by reflections inside the tube, and the distribution of the radiation intensity is homogenized across the cross section of the beam. At the same time, the tube (3) exerts a contact force (F) on the components (7.1, 7.2) that are to be welded together. Using a plurality of laser beams (6), to each of which a tube (3) is dedicated downstream, it is possible to create a simple and robust, component-specific system by means of which several or all weld spots can be simultaneously produced so as to conjoin the two components (7.1, 7.2).

10 Claims, 3 Drawing Sheets

(56) References Cited

FOREIGN PATENT DOCUMENTS

| | | | |
|---|---|---|---|
| DE | 100 05 593 C1 | 10/2001 | |
| DE | 102 57 112 A1 | 6/2004 | |
| EP | 1 254 737 A1 | 11/2002 | |
| EP | 2 036 653 A1 | 3/2009 | |
| EP | 2036653 A1 * | 3/2009 | ............ B23K 26/14 |
| EP | 2 101 336 A1 | 9/2009 | |
| JP | S 61 225885 A | 10/1986 | |
| JP | 09-070680 * | 3/1997 | ............ B23K 26/06 |

\* cited by examiner

SYSTEM FOR SPOT WELDING WITH A LASER BEAM

FIELD OF THE INVENTION

The present invention relates to a method for spot welding with a laser beam as it is generically known from DE 100 05 593 C1.

Regardless of the composition of the material of the two components that are to be welded together, the objective of spot welding is to permanently conjoin the two components via a predetermined number, location, shape and size of weld spots. In many applications, in particular if spot welding involves laser transmission welding of plastic materials, an additional objective is that the weld spots should not be visible on the laser-absorbent surface of the component.

Thus, in addition to the standard requirements to be met by tool assemblies, such as low maintenance, light weight, and material- and cost-efficiency, an industrially feasible system for spot welding should also meet the requirement of a uniform distribution of the laser energy in the weld spot.

It is obvious to the person skilled in the art that a weld spot is not a mathematically ideal point but a larger area with a predetermined contour which, as a rule, has the shape of a circle but which can, e.g., also have the shape of a rectangle.

PRIOR ART

DE 100 05 593 C1 discloses a manually or machine-guided autonomous system for spot welding. The system comprises a laser beam-generating unit that, downstream in the beam direction, is followed by a beam-forming optical system which forms the laser beam in such a manner that in the cross section of the laser beam, the energy distribution is ring-shaped or as uniform as possible and increases the weld spot. Downstream in the beam direction, the beam-forming optical system is followed by a movable hollow cylinder that has a number of functions.

In the resting position of the system, and thus while the system is being mounted on the components that are to be welded together, the hollow cylinder is extended and thus is located at its largest possible distance from the beam-forming optical system.

On the side of the beam-forming optical system, the hollow cylinder in the resting position is sealed, via a compression spring, by a flap attached to the housing of the system by means of a swivel joint, which serves as a beam trap.

By mounting the system while the opening of the hollow cylinder is open, the hollow cylinder is moved inside the housing in the direction of the beam-forming optical system and against the force exerted by the compression spring. Thus, the hollow cylinder is able to exert an increasing force on the components, which has the effect that, on the one hand, these components, within this area of welding, come into close surface contact, and, on the other hand, that the flap is opened at the same time. When the hollow cylinder is in the completely retracted position of, the force on the components is so high that it is equivalent to a predetermined contact force that is specific to the components to be welded together and that, against the spring tension of the compression spring, the flap is completely open so as to allow the laser beam to pass unhindered through the hollow cylinder and impinge on the components. As the flap moves into the opened position, it actuates a switch that activates the laser beam-generating unit.

The hollow cylinder which, in the context of the invention described below, is a tube with a circular cross section thus serves as a mechanical component which, when moved, ultimately actuates a switch. It also serves to ensure that, during welding, parts of the laser beam do not escape to the outside, and it serves as a pressure member via which a contact force acts on the components.

A special beam-forming optical system forms the beam as desired.

The practical examples described in DE 100 05 593 C1 differed as to the combination of a laser beam-generating unit used and the use of the optical elements that form the beam-forming optical system so as to obtain the desired distribution of radiation energy in the weld spot.

As an alternative, special optical elements, such as an axicon or a Fresnel lens, and special laser beam-generating units, such as an internally pumped high-power fiber laser, have been proposed.

Opening and closing a laser trap by mounting and removing the system and the associated actuation of a switch to doubly ensure that laser radiation is unable to escape from the system in case the system was not mounted properly as a means for automatically guiding and operating the system demands an unnecessarily high degree of technical complexity.

Another disadvantage of the device disclosed by DE 100 05 593 is that the contact force of the system is predetermined by the dimension of the compression spring, which means that the unit is optimized for a specific combination of components and can therefore not be automatically used for other combinations of components, in other words, components made of different materials or with different dimensions, in particular different material thicknesses in the welding area. In addition, the size of the weld spots is also predetermined by the beam-forming optical system and cannot be changed.

OBJECT OF THE INVENTION

The problem to be solved by the present invention is to make available a system for spot welding with a laser beam, which system can be easily produced and flexibly adapted to a variety of applications by variably adjusting the contact force and changing the size and shape of the weld spots with only minimal changes to the system.

This problem is solved with a system for spot welding with a laser beam, comprising at least one welding unit with an optical axis, along which a high-power diode laser 1, a beam-forming optical system and a tube are disposed, as well as a component-holding fixture in which the components that are to be welded together can be positioned relative to the welding unit. In addition, the system also comprises means for producing a contact force in the direction of the optical axis between the free end of the tube that faces away from the beam-forming optical system and the components that are to be welded together. The high-power laser, the beam-forming optical system and the tube are stationarily disposed relative to one another via a housing, and the inside circumferential surface of the tube is designed to be reflective for the laser beam. The beam-forming optical system is configured in such a manner that it converts a laser beam that is emitted by the high-power diode laser into a divergent laser beam, with the cross section of said beam conforming to the cross section of the hollow space of the tube by means of multiple reflections along the inside circumference of the tube, and with the distribution of the radiation intensity of said beam being homogenized across the cross section of the beam.

Ideally, the beam-forming optical system conforms the laser beam to the tube in such a manner that the beam is passed along inside the tube by total reflection.

The system preferably comprises a plurality of welding units, the number and configuration of which conforms to the number and configuration of the weld spots, by means of which the components that are to be welded together are to be conjoined, thereby making it possible to produce all weld spots at the same time. However, a component-specific system of this type can be used only to produce a specific pattern of weld spots, which is predetermined by the number and configuration of the weld spots.

Compared to a system that comprises only one welding unit, and by means of which, consistent with the individual weld spots, only one weld spot after the other can be produced, a system that comprises as few as, e.g., two or three welding units that are disposed along a straight line offers an advantage. Using this type of system, it is possible to produce groups of weld spots one group at a time, or, if several systems are simultaneously used, groups of weld spots at the same time. Thus, a system of this type makes it possible to produce a great variety of patterns of weld spots; however, it does not allow the spacing between the weld spots to be varied, while this is invariably possible with a system with only one welding unit.

The configuration of the tubes that results from the configuration of a plurality of welding units can be conveniently obtained using a metal block in which through-holes are disposed, the number of which equals the number and the configuration of the weld spots.

A special advantage is that, through the selection of the size and shape of the cross section of the tube, it is possible to predetermine the size and shape of the weld spots. In many cases, it is more suitable for a weld spot to have a rectangular shape instead of the normally round shape. Irrespective of its cross-sectional shape and size, such a tube can be inexpensively produced. The tube should be long enough to ensure that excellent homogenization can take place as a result of the large number of reflections, which leads to a uniformly strong weld joint within the weld spot.

To be able to design the contact surface, by means of which the end of the tube is pressed against the components that are to be welded together, regardless of the tubular cross section used, a pressure member can be conveniently attached to the free end of the tube.

It is recommended that the pressure member be a ring-shaped flat disk, a flat plate that seals the free end of the tube, or a cross-shaped element.

If a ring-shaped flat disk is used, it is possible to change the size and the shape of the contact surface relative to the free end of the tube, with the radiation able to pass unhindered through the center of the ring. This means that in the central area of the weld spot, the two components that are to be welded together do not make contact with each other.

If a cross-shaped element is used as the pressure member, the components that are to be welded together, consistent with the shape of the cross, also make partial contact in the central area. The additional reflection on the cross-shaped element leads to further homogenization.

Using a flat plate which is made of a material transparent to the laser beam and which seals the end of the tube, the components to be welded together are in contact with each other across the entire surface of the weld spot, which can be an advantage especially when sheeting materials are welded together.

It is recommended that the means for generating the contact force be a pneumatic cylinder with a pressure chamber and a cylinder piston.

It is especially useful if the pressure chamber is formed by the tube, which on the side of the beam-forming optical system, is sealed by means of a flat plate that is transparent to the laser, and which, together with the housing, is stationarily mounted on the rack. The cylinder piston passing through the tube and also consisting of a material transparent to the laser is pushed against the components to be welded together using a contact force that is generated by the excess pressure set in the pressure chamber.

It is also useful if the pressure chamber is stationarily mounted on the rack above the housing and if the cylinder piston is rigidly connected via a push rod to the pressure plate which is connected to the housing, which can be moved along the rack via a linear guide in the direction of the optical axis.

Stationarily mounted on the rack means, e.g., stationarily mounted on a traverse structure or on a robot arm which is locked into position during the welding procedure and which is able to absorb counteracting forces.

The means for generating a contact force can conveniently be simply the tube that is placed on the components to be welded together and in which excess pressure is built up, and which, on the side of the beam-forming optical system, is sealed by means of a flat plate that is transparent to the laser. In this case, the system and thus the tube are again stationarily mounted on the rack.

BRIEF DESCRIPTION OF THE DRAWINGS

The system will be explained in greater detail below by way of an example as shown in the drawing.

As can be seen.

DESCRIPTION OF THE EMBODIMENTS

Figure 1:
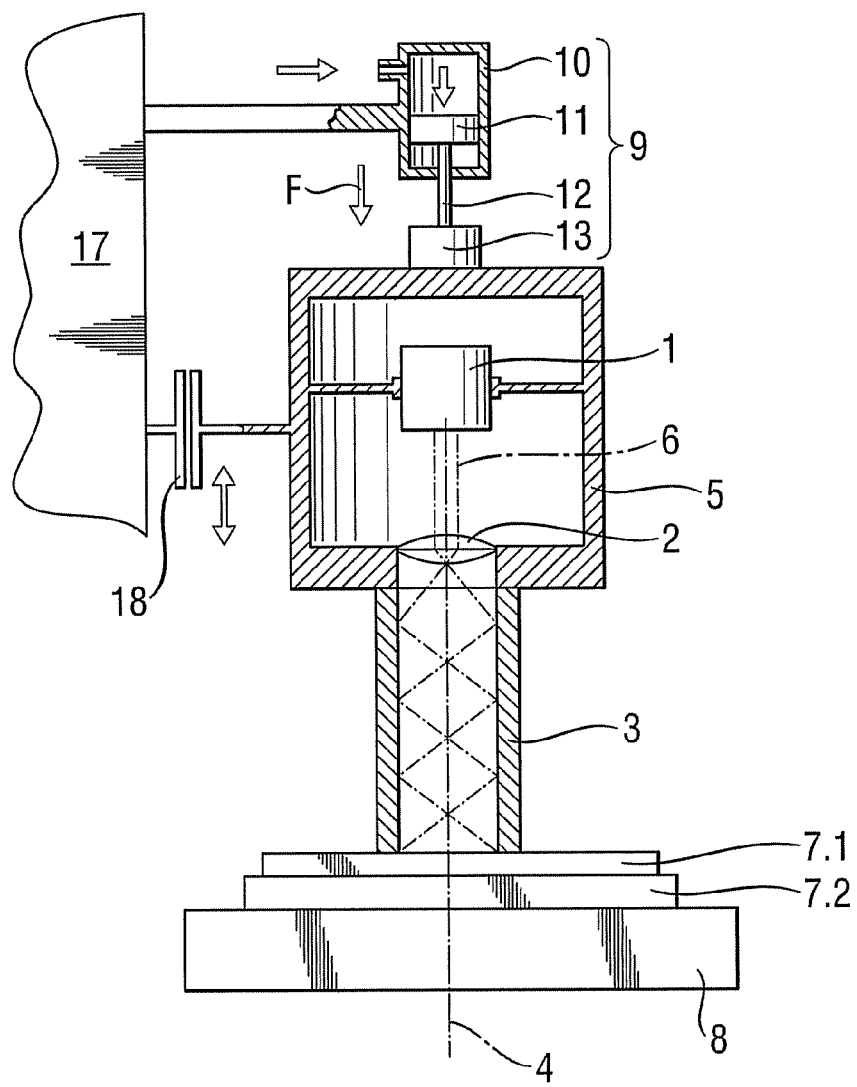
FIG. 1 shows a schematic sketch of a first practical example of a system for spot welding using a welding unit.

FIG. 1 shows a first practical example of a system for spot welding with a laser beam.

The system essentially comprises a high-power diode laser 1 which emits a laser beam 6, a beam-forming optical system 2 which, in the direction of the beam, is disposed downstream thereof and a tube 3, which together are disposed on an optical axis 4 and which are rigidly connected to each other via a housing 5.

It is useful if the high-power diode laser 1 is a laser diode bar that comprises a plurality of individual laser diodes, which, overall, form an emitting line measuring, e.g., 1×10 mm, which are preceded upstream by a collimating optical system.

The pre-collimated laser beam 6 is expanded by means of the downstream beam-forming optical system 2 to ensure that it is completely coupled into the tube 3 and has an angle of divergence that leads to multiple reflections as the laser beam passes through the tube. To minimize the radiation losses, multiple reflections should take place in the through total reflection.

To implement the method, the system is placed on two components 7.1, 7.2 to be welded together which are positioned relative to each other to obtain the intended shape and which are supported in a component-holding fixture 8 in such a manner that the axis of the tube, like the optical axis 4, is disposed vertically on the surface of the first component 7.1.

The tube 3 is pressed with a predetermined contact force F against the components 7.1, 7.2 to be welded together, with the contact force F, in the first practical example illustrated, being generated by a pneumatic cylinder 9.

The pneumatic cylinder 9 comprises a pressure chamber 10 and a cylinder piston 11, which is rigidly connected to a pressure plate 13 via a push rod 12.

Above the housing 5, the pressure chamber 10 is attached to a rack 17, and, via the push rod 12 which travels in the direction of the optical axis 4, the pressure plate 13 is pressed against the housing 5 which moves along a linear guide 18 on the rack 17 in the direction of the optical axis 4. By setting a predetermined excess pressure in the pressure chamber 10, the two components 7.1, 7.2 are compressed at a pre-selectable contact force F.

In this context, the rack 17 is a rigid stand, a traverse structure along which the system can be moved in a horizontal direction, or the arm of a robot.

Figure 2:
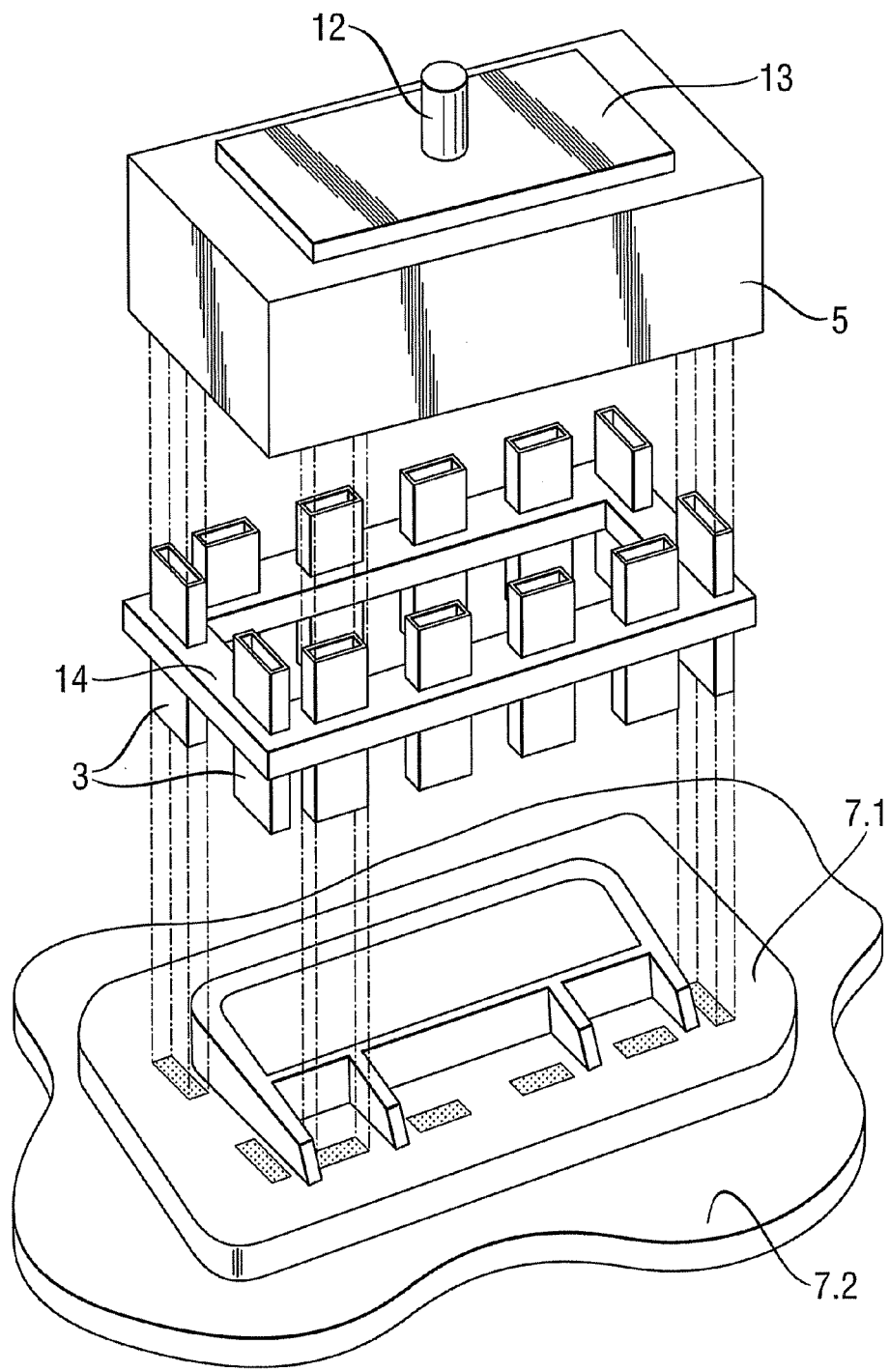
FIG. 2 shows an exploded view of a second practical example with a plurality of welding units.

FIG. 2 shows a second practical example of a system for spot welding.

On the components 7.1, 7.2 to be welded together as shown in this example, 12 weld spots are to be produced, which are to be spaced equally apart from one another and which are located along a line that describes a rectangle. The weld spots themselves are the same size, and their shape is rectangular so as to be able to produce a sufficiently large weld spot, e.g., between two rib-like members that are disposed along the first component 7.1. The shape, size and configuration of the weld spots relative to one another create a weld spot pattern.

The device shown in this particular practical example is component-specifically adapted to this weld spot pattern and therefore comprises a number of welding units equal to the number of weld spots provided to conjoin two specific components 7.1, 7.2. The welding units are disposed in a shared housing 5, and, as in the practical example shown in FIG. 1, a pressure plate 13, which is connected via a push rod 12 to a cylinder piston 11 (not shown) of a pneumatic cylinder 9, acts on the housing 5. The free ends of the tubes 3 that are associated with the welding units project from the housing 5 and are stabilized in a shared support frame 14.

The shared support frame 14 is located at a sufficiently large distance from the free ends of the tubes so as to ensure that, in spite of the rib-like members that project upward, it does not interfere with mounting the frame on the first component 7.1.

Instead of a support frame 14 with tubes that pass through holes provided for this purpose, it would also be possible to use a monolithic metal block in which through-holes are provided in a configuration and a cross section which correspond to the weld spot pattern. Although such a metal block would be comparatively heavier, it would be easier to produce and, in particular, to install. Overall, the system would be more robust, and instead of a plurality of contact surfaces that are formed by the ends of the tubes and the pressure members connected to them, only a single contact surface that comprises all weld spots would be present.

Figure 3A:
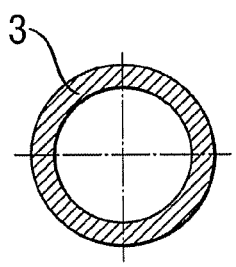
FIGS. 3a-3c show different cross-sectional shapes of the tube.
Figure 3B:
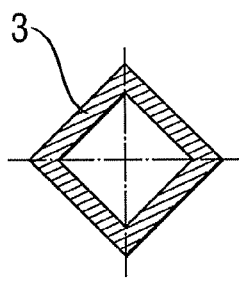
Figure 3C:
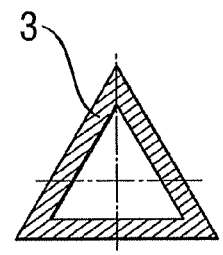

FIGS. 3a and 3b show three examples of cross-sectional shapes for potential embodiments of tube 3. A noncircular cross-sectional shape can be especially useful if, as indicated in FIG. 2, the space available for a spot weld is limited.

FIGS. 4a-4d show different ways in which the contact surface, which is always predetermined by the cross section of the tube, can be changed by added pressure members of different shapes and sizes so as to influence the quality of the weld spots.

Figure 4A:
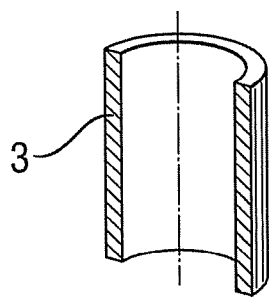
FIGS. 4a-4d show different practical examples of how to configure the contact surface.

As seen in FIG. 4a, the contact surface is determined by the cross section of the tube itself.

Figure 4B:
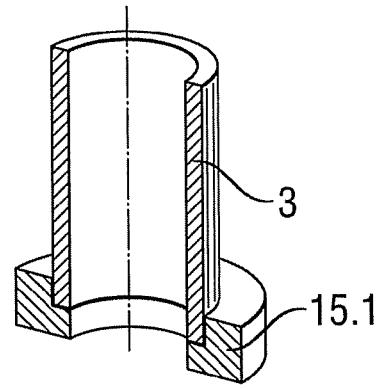
Figure 4C:
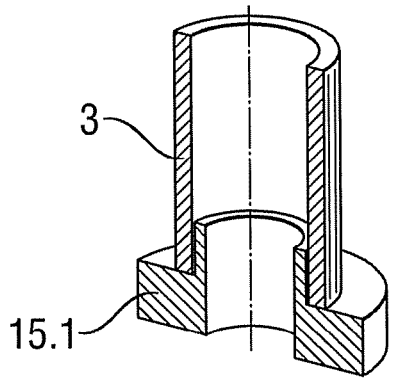

As FIG. 4b shows, a flat disk 15.1 is pushed over [the tube] while in FIG. 4c, a flat disk 15.1 has been inserted into the free end of the tube.

Figure 4D:
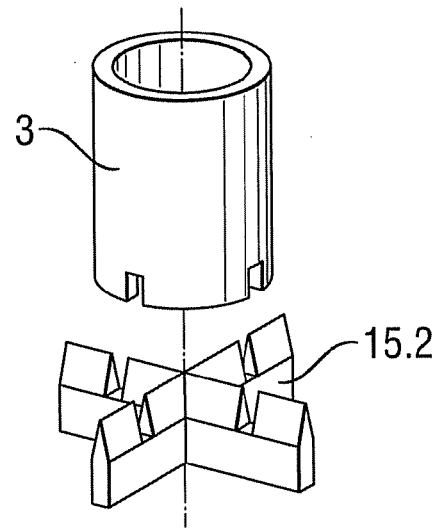

FIG. 4d shows a cross-shaped element 15.2 which can be attached to the free end of the tube.

Figure 5A:
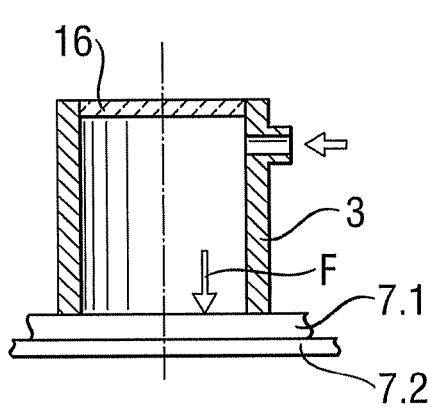
FIGS. 5a-5b show different practical examples of means for generating the contact force.
Figure 5B:
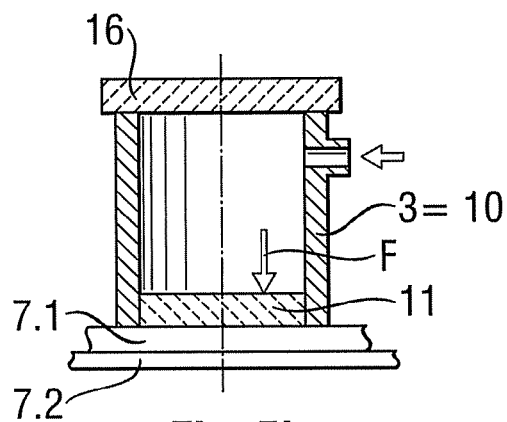

FIGS. 5a and 5b show additional potential embodiments of the means for generating the contact force F.

In FIG. 5a, the tube 3 is a chamber which is open relative to the components 7.1, 7.2 and which can be sealed by placing it on the first component 7.1 so that the chamber, when filled with compressed air, is pressed directly against the surface of the first component 7.1; as shown in FIG. 5b, as compressed air is filled into the pressure chamber 10 that is formed by tube 3, which, on the side of the beam-forming optical system 2, is sealed by flat plate 16 that is transparent to the laser, the cylinder piston 11 passing through tube 3 that is also transparent to the laser acts upon the components 7.1, 7.2. In both cases, the system is stationarily connected to the rack so as to be able to absorb a counteracting force that is equivalent to the generated contact force F.

In the practical examples described above, the component-holding fixture 8 is stationarily positioned, and the tube 3, which is rigidly connected to the housing 5, or an element that passes through the tube, is pressed against the components to be welded together.

Similarly, it is possible for the housing 5 and the tube 3 to be stationarily positioned and for the elements to be welded (members to be conjoined) to be pressed against the free end of the tube, i.e., the contact force F in this case is conducted via the component-holding fixture 8 to the components 7.1, 7.2 to be welded together. The component-holding fixture 8 can subsequently be moved along a linear guide 18 in the direction of the optical axis 4 so as to press the components 7.1, 7.2 against the tube 3 using a predetermined contact force F.

The system according to the present invention is comparatively lightweight and highly compact. The only supply media required are electrical current and cooling water. These media can be flexibly supplied by means of a cable and a hose. Thus, it is possible for a robot or an axis system to guide the system with high dynamics (i.e., short cycle times) and high positional accuracy into each welding position and for the end(s) of the tube to be pressed against the components to be welded together.

LIST OF REFERENCE CHARACTERS

1 High-power diode laser
2 Beam-forming optical system
3 Tube
4 Optical axis
5 Housing
6 Laser beam
7.1 First component to be welded
7.2 Second component to be welded
8 Component-holding fixture
9 Pneumatic cylinder
10 Pressure chamber
11 Cylinder piston
12 Push rod
13 Pressure plate
14 Support frame
15.1 Flat disk
15.2 Cross-shaped element
16 Flat plate 17 Rack
18 Linear guide
F Contact force

What is claimed is:

1. A system for laser transmission welding of plastic materials with a laser beam, comprising at least one welding unit having an optical axis along which a high-power diode laser and a beam-forming optical system are positioned, a tube disposed along said optical axis, a component-holding fixture in which components to be welded together are positioned relative to said welding unit, at least one of said components which is positioned closest to said laser beam as an upper component being transparent to said laser, means for generating a contact force between a free end of said tube that faces away from the beam-forming optical system and said components to be welded together in a direction of the optical axis, said high-power diode laser, the beam-forming optical system and the tube being stationarily configured relative to one another by way of a housing, the inside circumferential surface of the tube being reflective for the laser beam, said beam-forming optical system being configured in such a manner that it transforms a laser beam emitted by the high-power diode laser into a divergent laser beam, the cross section of which is adapted to the cross section of the hollow space of the tube by means of multiple reflections on the inside circumference of the tube and the distribution of radiation intensity of which laser beam is homogenized across the cross section of the beam, said means for generating a contact force being a pneumatic cylinder comprising a pressure chamber and a cylinder piston, said pressure chamber being formed by the tube which, on the side of the beam-forming optical system, is sealed by a flat plate that is transparent to the laser, and that the cylinder piston, which, passing through the tube, rests against the components to be welded together, is also made of a material that is transparent to the laser.

2. The system of claim 1, comprising a plurality of welding units, the number and configuration relative to one another being equal to the number and configuration of the weld spots, by means of which the components that are to be welded together are to be conjoined, thereby allowing all weld spots to be produced at the same time.

3. The system of claim 2, wherein the configuration of the tubes that results from the configuration of a plurality of welding units is formed by a metal block in which through-holes equal to the number and configuration of the weld spots are disposed.

4. The system of claim 1, wherein the size and shape of the weld spots is predetermined by the size and shape of the selected cross section of the tube.

5. The system of claim 1, wherein a pressure member is connected to the free tubular end of the tube so as to obtain a contact surface different from the cross section of the tube.

6. The system of claim 5, wherein the pressure member is a flat disk.

7. The system of claim 5, wherein the pressure member is a cross-shaped element.

8. The system of claim 5, wherein the pressure member is a flat plate made of a material that is transparent to the laser beam and which seals the free tubular end of the tube.

9. The system of claim 1, wherein the pressure chamber is stationarily attached to a rack above the housing and that the cylinder piston, via a push rod, is stationarily connected to a pressure plate which is connected to the housing, said housing being capable of being moved along the rack via a linear guide in direction of the optical axis.

10. The system of claim 1, wherein the means for generating a contact force is the tube which is placed onto the components to be welded together and to which excess pressure is applied, which tube, on the side of the beam-forming optical system, is sealed off by a flat plate that is transparent to the laser.

* * * * *